(12) United States Patent
Sekiguchi et al.

(10) Patent No.: US 6,623,126 B2
(45) Date of Patent: Sep. 23, 2003

(54) PROJECTOR FOR USE IN PLANETARIUM

(75) Inventors: Takamasa Sekiguchi, Yamanashi (JP); Uyuki Iizuka, Yamanashi (JP); Hiroaki In, Yamanashi (JP)

(73) Assignee: KabushiKigaisya Goto Kogaku Kenkyujyo, Tokyo (JP)

( * ) Notice: Subject to any disclaimer, the term of this patent is extended or adjusted under 35 U.S.C. 154(b) by 0 days.

(21) Appl. No.: 10/191,691

(22) Filed: Jul. 9, 2002

(65) Prior Publication Data

US 2003/0030777 A1 Feb. 13, 2003

(30) Foreign Application Priority Data

Aug. 10, 2001 (JP) ........................................ 2001-243642

(51) Int. Cl.[7] ............................................. G03B 21/14
(52) U.S. Cl. ......................... 353/62; 353/23; 434/286; 362/800
(58) Field of Search ............................ 353/43, 62, 95, 353/94, 23, 96; 434/286, 285; 362/555, 800

(56) References Cited

U.S. PATENT DOCUMENTS

| | | | | |
|---|---|---|---|---|
| 3,762,083 A | * | 10/1973 | Lemons et al. | 40/560 |
| 4,858,079 A | * | 8/1989 | Ohashi | 362/35 |
| 4,955,714 A | * | 9/1990 | Stotler et al. | 353/62 |
| 5,283,601 A | * | 2/1994 | Lowe | 353/62 |
| 5,971,545 A | * | 10/1999 | Haitz | 353/31 |
| 6,000,803 A | * | 12/1999 | Miller | 353/62 |

* cited by examiner

*Primary Examiner*—William Dowling
(74) *Attorney, Agent, or Firm*—Lackenbach Siegel, LLP

(57) ABSTRACT

Provision of a projector used for a planetarium which is capable of reducing electrical power consumption and size. The projector comprises a light source 1 constituted by an array of a plurality of light emitting diodes L for emitting illumination light. The emitted illumination light passes through a condenser lens 2 to impinge onto a original projection plate 3 provided with a light-permeable pattern P, and then a transmitted image is projected through a projection lens onto a dome screen.

12 Claims, 4 Drawing Sheets

PROJECTOR FOR USE IN PLANETARIUM

BACKGROUND OF THE INVENTION

1. Field of the Invention

This invention relates to a projector for use in a planetarium and, more particularly, to an invention effective in an auxiliary projector other than a fixed star projector and a planet projector.

2. Description of Related Art

In a planetarium, as well as projectors for projecting star bodies such as a fixed star projector and a planet projector, a variety of auxiliary projectors are used to enhance stage effects. Such projectors achieving widespread use include a so-called slide projector in which an illuminating light emitted from a light source 21 passes through a condenser lens 22, then through an original projection plate 23 on which a light-permeable pattern P is formed, and then through a projection lens 24 to project the transmitted image onto a dome screen S (see FIG. 9). An electric lamp is employed as the light source in such projector. Light emitted from the electric lamp is reflected by a reflecting mirror 25. The reflected light is also gathered by the condenser lens 22 and passed through the original projection plate 23.

Some images to be projected by the auxiliary projector in this manner are formed by the light-permeable pattern extending across the entire original projection plate, but in other case the light-permeable pattern has an area occupying only part of the entire projection plate, for example, a picture pattern such as a constellation and a space ship, and a coordinate system pattern such as the equator. For example, FIG. 10 shows a original projection plate 23 having a light-permeable pattern P for the equator, in which an area P1 of the light-permeable pattern is only the area surrounded by the long-dashed short-dashed line. However, in a projector in the prior art employing an electric lamp as a single light source, after the light emitted from the light source has been conically diffused, the diffused light is conically gathered by the condenser lens 22, and then passed through the original projection plate 23. Accordingly, a non-light-permeable portion B positioned around the area P1 of the light-permeable pattern is also uselessly irradiated with the light.

Due to the consumption of electric power for such wasted irradiation, the projector in the prior art is uneconomic as well as producing additional heat. As a result, there are problems of an increase in size of the projector, and of the unavoidable use of a glass-made original plate with high cost and low operability without general versatility because the high temperature inside the projector does not permit the use of a film-type original plate of low heat resistance as the project original plate.

SUMMARY OF THE INVENTION

It is therefore an object of the present invention to solve the problems associated with the prior art as described above, and to provide a projector having new advantages. The present invention disclosed herein essentially has three features. According to a first of the three features, the present invention provides a projector for irradiating an original projection plate provided with a light-permeable pattern with an illuminating light to project a transmitted image through a projection lens onto a dome screen, which comprises a light source including an array of a plurality of light emitting diodes for emitting the illumination light.

According to a second feature, based on the first feature, the light emitting diodes are arranged in a configuration allowing an area of emission of the illuminating light onto the original projection plate to be minimized to a region covering a light-permeable area of the light-permeable pattern.

According to a third feature, based on the first feature, when a projected image straddles a horizon on the dome screen, part of the array of light emitting diodes are shut off to block projection below the horizon.

The present invention effectively provides unique advantages as follows.

(1) In consequence of using light emitting diodes as the light source, the electrical power consumption is reduced as compared with the use of an electric lamp. Particularly, when the light emitting diodes are arranged in a configuration allowing an area of emission of the illuminating light onto the original projection plate to be minimized to a region covering a light-permeable area of the light-permeable pattern, the electrical power consumption is further reduced.

(2) Likewise, the amount of heating in the projector according to the present invention is lower than that in the conventional projector using an electric lamp. Accordingly, it is possible to use a film-type original plate, especially, a color film-type original plate as the original projection plate, which is difficult in the prior art, resulting in advantages in cost, productivity and general versatility.

(3) A flat plate-shaped Fresnel lens is employed for a condenser lens. Therefore the use of such condenser lens, together with a light source with the small thickness, makes it possible to decrease the length of the projector. At the same time, the setting of the arrangement of the light emitting diodes as described in advantage (1), and further the setting the condenser lens having a shape to fit the light-permeable pattern, allow reduction of the projector in width and vertical dimensions. Since there is no worry of the occurrence of internal overheating even in the event of a decrease in size due to the low amount of heating as described above, a significant reduction in the overall size of the projector is achieved.

(4) A combination of the light emitting diodes with different colors used as the light source facilitates the color-coding of the projected images. Hence, it is possible to overcome the problem associated with constraints on the projection of color images due to the fact that the heat causes a fading of the color in the colored original projection plate.

DETAILED DESCRIPTION OF THE PREFERRED EMBODIMENTS

Figure 1:
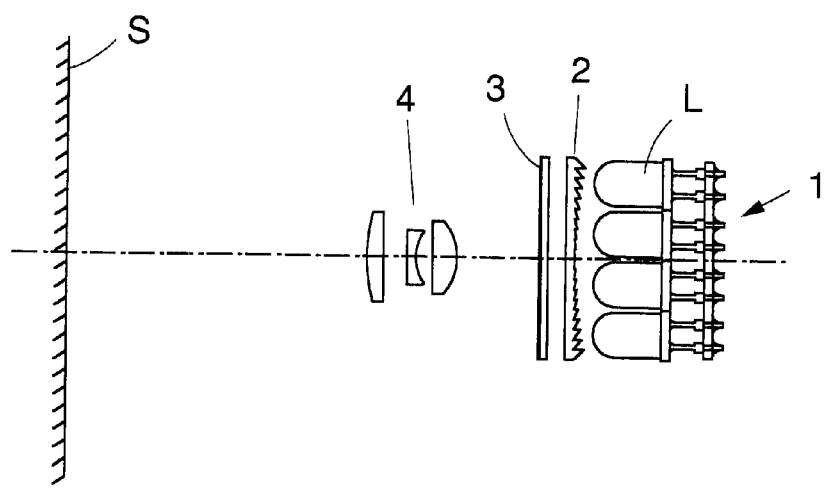
FIG. 1 is a side view of an optical system of a projector according to an embodiment of the present invention.

FIG. 1 to FIG. 4 illustrates an embodiment of a projector according to the present invention, in which reference numeral 3 represents an original projection plate and the projector is assumed to be projecting a constellation pattern. In front of the original projection plate 3, a projection lens 4 is placed for projecting a transmitted image onto a dome screen S.

Figure 2:
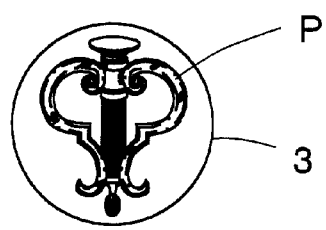
FIG. 2 is a front view of an original projection plate used in the projector.
Figure 3:
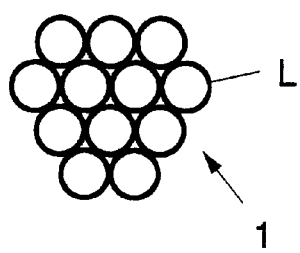
FIG. 3 is a front view of a light source of the projector.

As illustrated in FIG. 2, a light-permeable pattern P of the constellation pattern has a symmetrical outline with respect to the vertical center line with a somewhat narrower width in the upper part, a maximum width in the shoulder part and a narrow width in the lower part. In this case, the outline constitutes a light-permeable area of the light-permeable pattern. Reference numeral 1 represents a light source composed of an array of a plurality of light emitting diodes (referred to hereinafter as "LED") L, which is a feature of the present invention. In the embodiment, as illustrated in FIG. 3, the twelve LEDs L are arranged in a symmetrical left-right configuration of four rows in the vertical direction made up of three LEDs, four LEDs, three LEDs and two LEDs in order from the top row downward. With this arrangement, an area of light emission from the light source onto the original projection plate 3 is minimized to a region covering the light-permeable area of the light-permeable pattern P.

Figure 4:
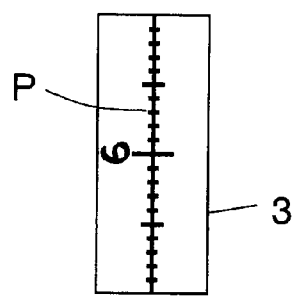
FIG. 4 is a front view of a condenser lens of the projector.

Referring to FIGS. 1 and 4, a condenser lens 2, which is an aspherical Fresnel lens in the embodiment, is placed between the light source 1 and the original projection plate 3. It should be mentioned that the lens is not required when the illumination with respect to a projected image is low. The Fresnel lens used here is made of a plastic of outstanding moldability, the use of which is made possible by using LED not dissipating as high a heat as an electric lamp does for the light source. The Fresnel lens has a flat plate shape and therefore a thickness significantly smaller than that of a condenser lens consisting of a plurality of lenses used in the prior art. Likewise, the light source 1 composed of an array of LEDs L has a small thickness. Thus, the reduced thicknesses of both the condenser lens 2 and light source 1, make it possible to considerably shorten the length of the projector.

Figure 5:
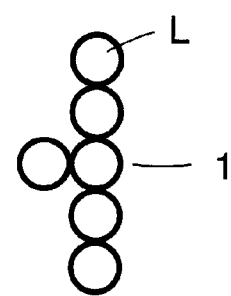
FIG. 5 is a front view illustrating another original projection plate used in the projector.
Figure 6:
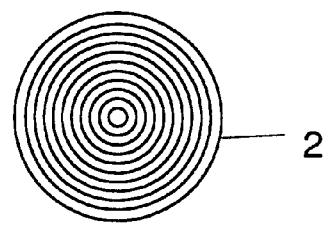
FIG. 6 is a front view of another light source of the projector.
Figure 7:
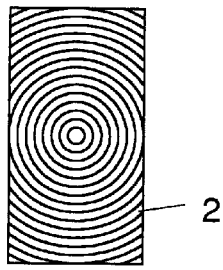
FIG. 7 is a front view of another condenser lens of the projector.

Next, FIG. 5 to FIG. 7 illustrate an example when an original projection plate 3 has another light-permeable pattern P formed on it, in which the projector is assumed to be projecting a coordinate line of the equator. The light-permeable pattern P of the coordinate line has an outline essentially consisting of a vertical line with a numeral jutting out from the edge of the line as illustrated in FIG. 5. In this case, the outline constitutes a light-permeable area of the light-permeable pattern. Reference numeral 1 in FIG. 6 represents a light source in this example, which includes five LEDs L aligned in line in a vertical direction and one LED L positioned next to the middle positioned LED of the five LEDs. With this arrangement of the LEDs, an area of emission of light from the light source onto the original projection plate 3 is minimized to a region covering the light-permeable area of the light-permeable pattern P.

A condenser lens 2 constituted by an aspherical Fresnel lens in this example has a vertically extended rectangular shape which is minimized to a region capable of covering the above area of emission of light from the light source 1.

Typically, the coordinate line projected onto the dome screen is color-coded to help the audience distinguish with ease, but the colors on the original projection plate may fade due to the high heat. The light source of the present invention involves an array of a plurality of LEDs dissipating a low amount of heat. Therefore, it is possible to apply different colors to different projected images with ease by means of a combination of LEDs individually emitting different color lights.

Figure 8:
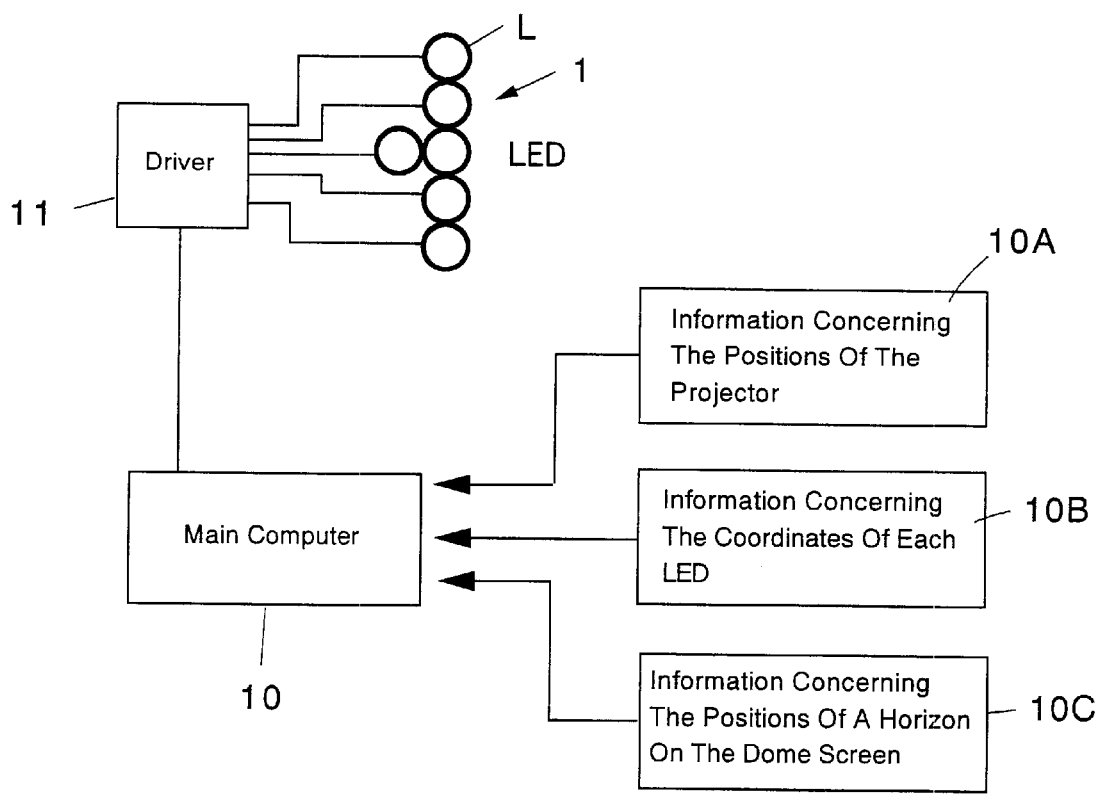
FIG. 8 is a block diagram of a lighting circuit for the light source.
Figure 9:
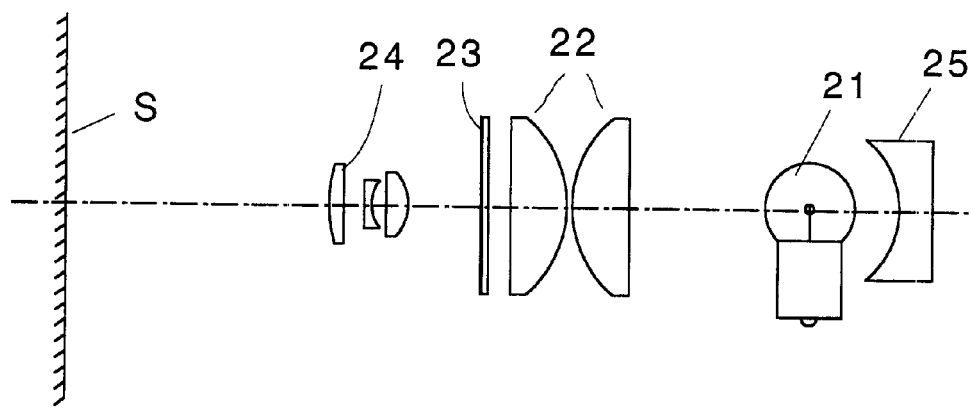
FIG. 9 is a side view of an optical system of a projector according to the prior art.
Figure 10:
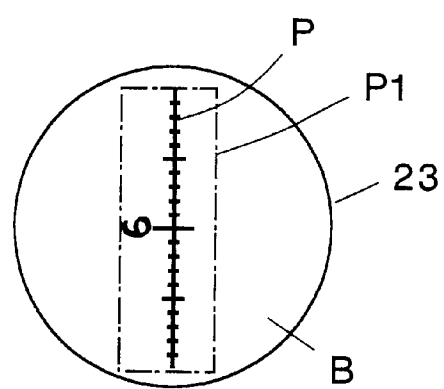
FIG. 10 is a front view of an original projection plate used in the projector in FIG. 9.

FIG. 8 is a block diagram of an example of a lighting circuit for the light source 1 of the projector according to the present invention. In the example, the LEDs L of the light source 1 are individually lighted by an LED driver 11 controlled by a main computer 10 of the planetarium. For the control, the main computer 10 refers information 10A concerning the positions of the projector which are changed with the operation of the planetarium, information 10B concerning the coordinates of each LED L of the light source of the projector, and information 10C concerning the positions of a horizon on the dome screen. When the projected image straddles the horizon on the dome screen, the computer 10 performs an operation to instruct part of the array of LEDs to be shut off, to implement a shutter action of blocking projection below the horizon.

What is claimed is:

1. A projector for use in a planetarium, for irradiating an original projection plate, provided with a light-permeable pattern, with an illuminating light for projection of a transmitted image through a projection lens onto a dome screen, comprising:

a light source including an array of a plurality of light emitting diodes for emitting the illuminating light to pass through the original projection plate.

2. A projector for use in a planetarium according to claim 1, further comprising a condenser lens interposed between said light source and said original projection plate.

3. A projector for use in a planetarium according to claim 1, wherein said light emitting diodes are arranged in a configuration allowing an area of emission of the illuminating light onto said original projection plate to be minimized to a region covering a light-permeable area of said light-permeable pattern.

4. A projector for use in a planetarium according to claim 2, wherein a Fresnel lens is used as said condenser lens.

5. A projector for use in a planetarium according to claim 4, wherein said condenser lens is set to have a shape minimized to a region capable of covering an area of emission of the light from said light source.

6. A projector for use in a planetarium according to claim 1, wherein when the projected image straddles a horizon on the dome screen, part of said array of light emitting diodes are shut off to block projection below the horizon.

7. A projector for use in a planetarium according to claim 2, wherein when the diodes are arranged in a configuration allowing an area of emission of the illuminating light onto said original projection plate to be minimized to a region covering a light-permeable area of said light-permeable pattern.

8. A projector for use in a planetarium according to claim 2, wherein when the projected image straddles a horizon on the dome screen, part of said array of light emitting diodes are shut off to block projection below the horizon.

9. A projector for use in a planetarium according to claim 3, wherein when the projected image straddles a horizon on the dome screen, part of said array of light emitting diodes are shut off to block projection below the horizon.

10. A projector for use in a planetarium according to claim 7, wherein when the projected image straddles a horizon on the dome screen, part of said array of light emitting diodes are shut off to block projection below the horizon.

11. A projector for use in a planetarium according to claim 4, wherein when the projected image straddles a horizon on the dome screen, part of said array of light emitting diodes are shut off to block projection below the horizon.

12. A projector for use in a planetarium according to claim 5, wherein when the projected image straddles a horizon on the dome screen, part of said array of light emitting diodes are shut off to block projection below the horizon.

* * * * *